United States Patent [19]

Nelson

[11] 4,366,718

[45] Jan. 4, 1983

[54] BI-DIRECTIONAL FLOW TRANSDUCER

[75] Inventor: Roger J. Nelson, Cedar Falls, Iowa

[73] Assignee: Deere & Company, Moline, Ill.

[21] Appl. No.: 228,437

[22] Filed: Jan. 26, 1981

[51] Int. Cl.³ .............................................. G01F 1/22
[52] U.S. Cl. .............................. 73/861.58; 73/861.71
[58] Field of Search ....................... 73/861.52–861.58, 73/861.74, 861.71, 861.61

[56] References Cited

U.S. PATENT DOCUMENTS

| | | |
|---|---|---|
| 2,609,831 | 9/1952 | MacGeorge . |
| 2,755,664 | 7/1956 | Chapman ......................... 73/861.57 |
| 3,076,335 | 2/1963 | Rosaen . |
| 3,304,780 | 2/1967 | Lee et al. ...................... 73/861.94 X |
| 3,528,288 | 9/1970 | Scourtes . |
| 3,623,046 | 11/1971 | Scourtes . |
| 3,805,611 | 4/1974 | Hedland ......................... 73/861.58 |
| 4,003,255 | 12/1976 | Spencer . |
| 4,041,758 | 8/1977 | Stenberg . |
| 4,205,592 | 6/1980 | Haüssler . |

OTHER PUBLICATIONS

Hedland Products, "Hedland Flowmeter".
Schaevitz Engineering, "AC LVDTs With Special Physical Configuration".
Fink, ed., "Electronics Engineers Handbook", McGraw-Hill, 1975, pp. 17-55 and 17-56, (FIGS. 17-81).

Primary Examiner—Charles A. Ruehl

[57] ABSTRACT

A bi-directional fluid flow transducer includes a hollow cylindrical housing which slidably receives a movable hollow cylindrical core which coaxially receives a fixed rod or valve member. A pair of springs are biased to urge the core to a neutral position. The core is displaced from its neutral position in the direction of fluid flow by an amount linearly proportional to the rate of fluid flow. An LVDT coil and circuit generate an output signal which represents the amount and direction of core displacement.

14 Claims, 1 Drawing Figure

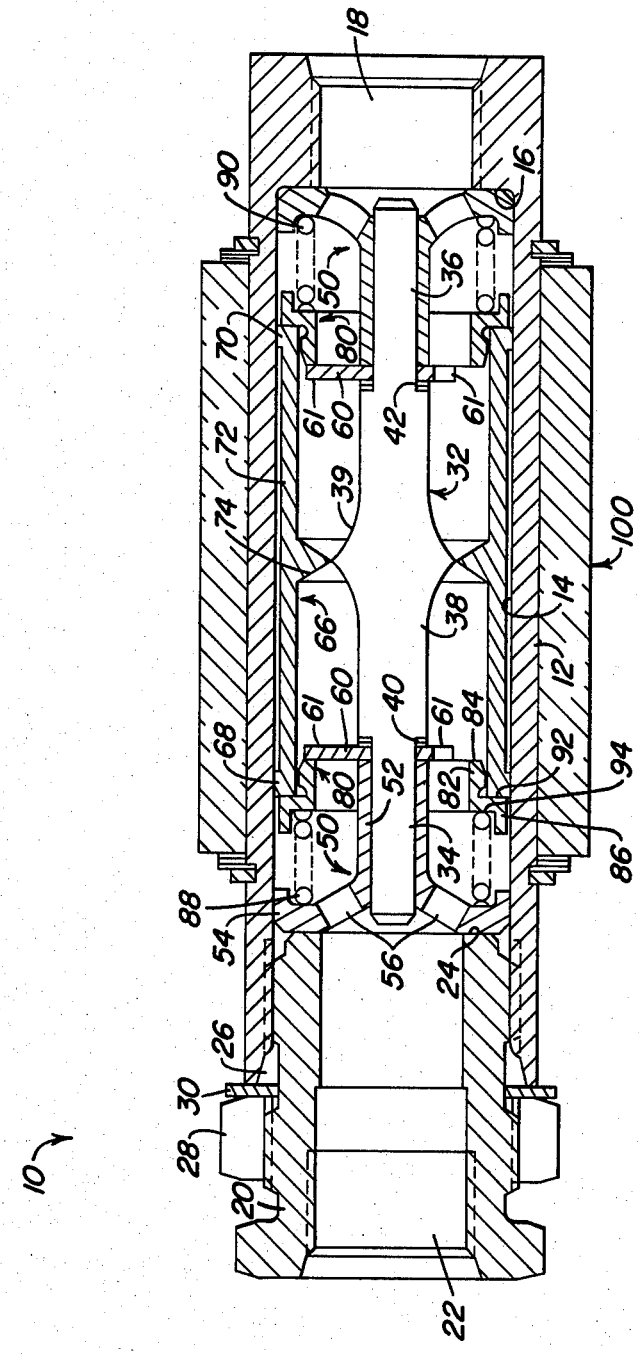

BI-DIRECTIONAL FLOW TRANSDUCER

BACKGROUND OF THE INVENTION

This invention relates to a fluid flow transducer of the bi-directional type.

It is becoming a more common practice to electronically control the operation of hydraulic circuits, and in the control of hydraulic circuits, it is often desirable to sense the rate of flow of hydraulic fluid through some portion of the circuit. Thus, it is desirable to have a fluid flow sensor which generates an electrical signal which represents the fluid flow and which has a linear relationship with respect to the rate of fluid flow. Finally, it is desirable to have an inexpensive electro-hydraulic fluid flow sensor which senses fluid flow in both forward and reverse directions.

SUMMARY OF THE INVENTION

An advantage of the present invention is that it provides an electro-hydraulic fluid flow transducer which responds to bi-directional fluid flow.

Another advantage of the present invention is that it provides an electro-hydraulic flow transducer with a linear response.

These and other advantages are achieved by the present invention which provides a flow sensor housing with a bore which slidably receives a movable hollow cylindrical magnetic core. A rod is mounted coaxially within the core and is fixed with respect to the housing. The core and rod define a variable annular flow restriction therebetween. A pair of springs act on opposite ends of the core and are biased to maintain the core in a neutral position. Abutments are operable to uncouple the core from one of the springs when the core is displaced to compress the other spring. The displacement of the core is linear with respect to fluid flow in either direction and an LVDT displacement transducer generates an electrical output signal representing the core displacement.

BRIEF DESCRIPTION OF THE DRAWINGS

The FIGURE is a cross-sectional side view of applicant's flow transducer.

DETAILED DESCRIPTION

A bi-directional fluid flow transducer 10 includes a housing 12 of a non-magnetic material such as a non-magnetic-type stainless steel. Housing 12 has a stepped bore 14 defining a shoulder 16 and a port 18. One end of the housing 12 threadably receives an end fitting 20 which includes a port 22 and shoulder 24. A fluid-tight seal between fitting 20 and housing 12 is maintained by means of O-ring seal 26, locknut 28 and washer 30. Fluid may flow between ports 18 and 22 and through the bore 14 in either direction.

An axially symmetrical valve member or rod 32 is positioned centrally and coaxially in the bore 14. Rod 32 includes a pair of smaller diameter end portions 34 and 36 separated from a larger non-uniform diameter central portion 38 by a pair or annular and outwardly facing shoulders 40 and 42. The central rod portion 38 includes an outwardly extending ridge 39 which tapers smoothly and symmetrically without any discontinuities from a maximum diameter at its center to a uniform diameter portion which terminates at the shoulders 40 and 42.

The rod 32 is supported by a pair of identical supports 50, each with a hollow cylindrical central portion 52 which receives a corresponding one of the smaller diameter rod portions 34 or 36. Each support 50 also includes a flange portion 54 which engages the wall of bore 14 and which engages a corresponding one of the shoulders 24 or 16. Each flange portion 54 includes a frustoconical portion through which extends six (6) uniformly spaced bores 56 with axes oriented at an angle of 30 degrees with respect to the longitudinal axis of the rod 32. (Two of the six bores 56 are visible in the single FIGURE). A pair of apertured spacers 60 are positioned coaxially on the smaller diameter rod portions 34 and 36 between the supports 50 and corresponding shoulders 40 and 42. Each spacer 60 includes three radially extending arms 61, two of which are visible in the FIGURE. Annular shims are inserted onto the rod portions 34 and 36 between the spacers 60 and the shoulders 40 and 42 so that the rod 32, the spacers 60 and the supports 50 are rigidly fixed axially with respect to the housing 12 between shoulders 24 and 16.

An axially symmetrical sleeve or magnetic core 66 coaxially surrounds the rod 32 and is movably mounted in bore 14. Core 66 includes a pair of larger outer diameter end flanges 68 and 70 on either end of a cylindrical central portion 72 with a smaller outer diameter. End flanges 68 and 70 slidably engage the wall of bore 14. An annular ridge 74 of triangular cross-section extends radially inwardly from the central sleeve portion 72. Ridge 74 cooperates with the ridge 39 of rod 32 to define a variable annular restriction to fluid flow through bore 14 depending upon the axial position of the core 66 relative to the rod 32. A small annular clearance exists between ridges 74 and 39 when the core 66 is in the neutral position shown in the FIGURE. Ridges 74 and 39 are shaped so that the displacement of core 66 will vary linearly as a function of the rate of fluid flow.

Flow transducer 10 also includes a pair of identical cylindrical guides 80. Each guide 80 includes a smaller diameter cylindrical portion 82 slidably received by a corresponding end of the core 66 and an annular end face 84 which is engageable with the arms of a corresponding one of the spacers 60. Each guide 80 also includes a larger diameter portion 86 which receives a corresponding one of a pair of centering springs 88 and 90. Each guide 80 also includes an annular shoulder 92 which is engageable with a corresponding end of core 66 and an annular shoulder 94 which engages a corresponding one of the springs 88 and 90. The other ends of springs 88 and 90 engage corresponding ones of the supports 50. The springs 88 and 90 are both biased to urge the core 66 via guides 80 to a centered or neutral position with respect to the rod 32 and housing 12 (as seen in FIG. 1) in the absence of fluid flow through bore 14. Both springs 88 and 90 are slightly preloaded when the core 66 is in the neutral position so that the springs 88 and 90 may center the core 66 in spite of frictional losses.

The axial position of core 66 may be sensed by a conventional linear visible differential transformer (LVDT) which may include a cylindrical LVDT coil assembly 100, such as made by Schaevitz Engineering of Camden, New Jersey and which may be coaxially mounted on the exterior of the non-magnetic housing 12. A conventional electrical circuit, such as described on pages 17-55 and 17-56 of D. G. Fink's *Electronics Engineers Handbook*, McGraw-Hill, 1975, may be connected to the coil assembly 100 to generate an electrical output signal which represents the axial position of the core 66 relative to the coil assembly 100.

Mode of Operation

When no fluid is flowing through the bore 14, the springs 88 and 90 maintain the core 66 in the neutral position shown in the FIGURE. However, fluid flow through bore 14 causes the core 66 to be displaced from the neutral position in the direction of the fluid flow and by an amount proportional to the rate of fluid flow. For example, if fluid is flowing to the right, viewing the FIGURE, then the core 66 will be displaced to the right, compressing spring 90 until the flow forces are balanced by the increased resistance of spring 90. When core 66 moves rightwardly from its neutral position, the spacer 60 engages the end face 84 of the left-hand guide 80 and prevents guide 80 from moving to the right along with core 66. This engagement uncouples the spring 88 from the core 66. In this manner, when the core is displaced left or right from the neutral position, only one of the springs 88 or 90 exerts any force on the core 66. The core assembly 100 and LVDT circuit (not shown) operate in a conventional manner to produce output signals which represent the direction and magnitude of the core displacement, and thus represent the direction and magnitude of the fluid flow through bore 14. Increased efficiency and sensitivity is achieved by having the cylindrical core 66, rather than the rod 32, be the movable flow responsive member. This increased efficiency and sensitivity results from the close proximity and the resulting increased magnetic flux linkages between the movable core 66 and the fixed LVDT coil assembly 100.

I claim:

1. A bi-directional flow transducer comprising:
a housing defining a flow passage for bi-directional flow therethrough;
a rod member mounted in the flow passage;
a flow responsive movable member positioned in the flow passage and spaced apart from the rod to define a variable flow restriction therebetween, the movable member having a neutral position in the absence of flow, the movable member being movable from the neutral position in the direction of fluid flow to displaced positions indicative of the rate of fluid flow through the flow passage;
a pair of resilient members coupled to opposite ends of the movable member and biased to urge the movable member to its neutral position;
a pair of abutment members fixed relative to the rod and engageable with respective ones of the resilient members, each abutment member engaging the respective resilient member to uncouple the respective resilient member from the movable member when the movable member moves from the neutral position and towards the other resilient member; and
sensing means for generating an output signal indicative of the position of the movable member.

2. The flow transducer of claim 1, further comprising:
a pair of support members in the flow passage, each having a central axial bore for receiving a portion of the rod and having a generally radially extending flange engaging the housing, the flange having apertures for permitting fluid flow therethrough.

3. The flow transmission of claim 2, wherein:
the rod comprises a larger diameter portion and a pair of smaller diameter portions, the larger diameter portion being interconnected with the smaller diameter portions by a pair of annular shoulders, each abutment member being coaxially mounted on a corresponding one of the smaller diameter rod portions and each abutment member being held between one of the support members and a corresponding one of the annular shoulders, each abutment member cooperating with the corresponding annular shoulder to uncouple the respective resilient member from the movable member.

4. The flow transducer of claim 1, wherein:
the movable member comprises a cylindrical sleeve having a portion having a smaller outer diameter and having a pair of portions having larger outer diameters, the outer peripheral surface of the larger outer diameter portions slidably engaging the housing.

5. The flow transducer of claim 1, wherein:
the rod comprises a larger diameter portion and a pair of smaller diameter portions, the larger diameter portion being interconnected with the smaller diameter portions by a pair of annular shoulders, the annular shoulders cooperating with the abutment members to uncouple the respective resilient members from the movable member.

6. The flow transducer of claim 1, wherein each resilient member comprises:
a spring mounted in the flow passage coaxially surrounding an end portion of the rod and a cylindrical member having a first shoulder engaging the spring, a second shoulder engageable with the movable member and a third shoulder engageable with a corresponding abutment member.

7. A bi-directional flow transducer comprising:
a housing defining a flow passage for bi-directional flow therethrough;
a rod member mounted in the flow passage;
a movable member slidably engaging the housing, the rod and the movable member defining a variable flow restriction therebetween, the movable member having a neutral position in the absence of flow, the movable member being movable from the neutral position in the direction of fluid flow to displaced positions indicative of the rate of fluid flow through the flow passage;
a pair of resilient members acting on opposite ends of the movable member and biased to urge the movable member to its neutral position;
a pair of abutment members fixed relative to the rod and engageable with respective ones of the resilient members, each abutment member engaging the respective resilient member to uncouple the respective resilient member from the movable member when the movable member moves from the neutral position towards the other resilient member; and
sensing means for generating an output signal indicative of the position of the movable member.

8. A bi-directional flow transducer comprising:
a housing defining a flow passage for bi-directional flow therethrough;
a valve member mounted centrally in the flow passage and fixed with respect to the housing;
a movable member slidably engaging the housing and movable in the flow passage in response to flow therethrough, the movable member having a central axis bore for fluid flow therethrough and for receiving the valve member, the movable member and the valve member cooperating to define a variable flow restriction therebetween, the movable member having a neutral position in the absence of flow, the movable member being movable from the neutral position in the direction of fluid flow to displaced positions indicative of the rate of fluid flow through the flow passage;

first and second resilient members each acting on a respective end of the movable member, the first and second resilient members being oppositely biased to urge the movable member toward its neutral position; and abutment means fixed to the valve member for uncoupling one of the resilient members from the movable member when the movable member moves from the neutral position to a displaced position and towards the other resilient member.

9. A flow transducer comprising:

a housing defining a flow passage for bi-directional fluid flow therethrough;

a hollow cylindrical sleeve movably mounted in the passage and movable in response to fluid flow to positions indicative of the rate of fluid flow through the passage;

a pair of resilient members each biased to urge the sleeve in a direction opposite to the direction of fluid flow;

a pair of guide members each having a portion slidably received by the sleeve, a first shoulder engaging a corresponding one of the resilient members, a second shoulder engageable with the sleeve, and a third shoulder;

a pair of stop members each engageable with the third shoulder of a corresponding one of the guide members to uncouple the corresponding one of the resilient members from the sleeve upon at least a predetermined movement of the sleeve; and sensor means for generating an output signal indicative of the position of the sleeve.

10. The flow transducer of claim 9 further comprising:

a valve member mounted in the passage, fixed with respect to the housing and cooperating with the sleeve to define a variable flow restriction therebetween.

11. The flow transducer of claim 10, wherein:

the stop members are fixed with respect to the valve member.

12. The flow transducer of claim 10, wherein:

the valve member comprises a larger diameter portion and a pair of smaller diameter portions interconnected with the larger diameter portion by a pair of annular shoulders to prevent motion of that stop member in the direction of fluid flow.

13. A fluid flow transducer comprising:

a housing defining a flow passage for bi-directional fluid flow therethrough;

a hollow cylindrical sleeve movably mounted in the passage and movable in response to fluid flow to positions indicative of the rate of fluid flow through the passage;

a pair of resilient members each biased to urge the sleeve in a direction opposite to the direction of fluid flow;

a pair of guide members each coupling a corresponding one of the resilient members to the sleeve, each guide member comprising a larger diameter portion receiving a portion of the corresponding resilient member, a smaller diameter portion slidably received by the sleeve, a first shoulder engaging the corresponding resilient member and a second shoulder engagable with the sleeve; and sensor means for generating an output signal indicative of the position of the sleeve.

14. A fluid flow transducer comprising:

a housing having a walled housing bore extending therethrough, the bore defining a flow passage of bi-directional fluid flow therethrough, the housing having oppositely facing housing shoulders located near opposite ends of the flow passage;

a pair of support members each having a central bore extending axially therethrough and each having a flange engaging a corresponding one of the shoulders and engaging the wall of the housing bore;

a rod member with a larger diameter central portion and a pair of smaller diameter end portions, each end portion being engagingly received by the central bore of a corresponding one of the support members, the end portions being interconnected with the central portion by a pair of annular abutments;

a pair of stop members each mounted on a corresponding one of the rod member end portions between one of the support members and one of the annular abutments, the stop members and the support members cooperating with the housing, the housing shoulders and the annular abutments to hold the rod in a central position in the bore and fixed with respect to the housing;

a hollow cylindrical magnetic conductive sleeve slidably engaging a wall of the housing bore, movable therein in response to fluid flow to positions indicative of the rate of fluid flow and cooperating with the rod member central portion to define a variable flow restriction therebetween;

a pair of guide members, each having a cylindrical portion slidably received by a corresponding end of the sleeve, a first shoulder engageable with a corresponding one of the stop members, a second shoulder engageable with an end face of a corresponding end of the sleeve, and a third shoulder;

a pair of resilient members, each having one end engaging a corresponding one of the support members and having another end engaging the third shoulder of a corresponding one of the guide members, the resilient members being oppositely biased to urge the sleeve via the guide members to a neutral position in the absence of fluid flow, each stop member being engagable with the corresponding guide member to uncouple one of the resilient members from the sleeve upon movement of the sleeve from the neutral position and towards the other resilient member; and reluctive displacement transducer means coaxially mounted on the housing for sensing the position of the sleeve.

* * * * *

UNITED STATES PATENT AND TRADEMARK OFFICE
CERTIFICATE OF CORRECTION

PATENT NO. : 4,366,718

DATED : January 4, 1983

INVENTOR(S) : Roger J. Nelson

It is certified that error appears in the above-identified patent and that said Letters Patent is hereby corrected as shown below:

Column 4, line 64, delete "axis" and insert -- axial --.

Column 6, line 13, delete "of" and insert -- for --.

Signed and Sealed this

Fourth Day of October 1983

[SEAL]

Attest:

GERALD J. MOSSINGHOFF

Attesting Officer

Commissioner of Patents and Trademarks